UNITED STATES PATENT OFFICE.

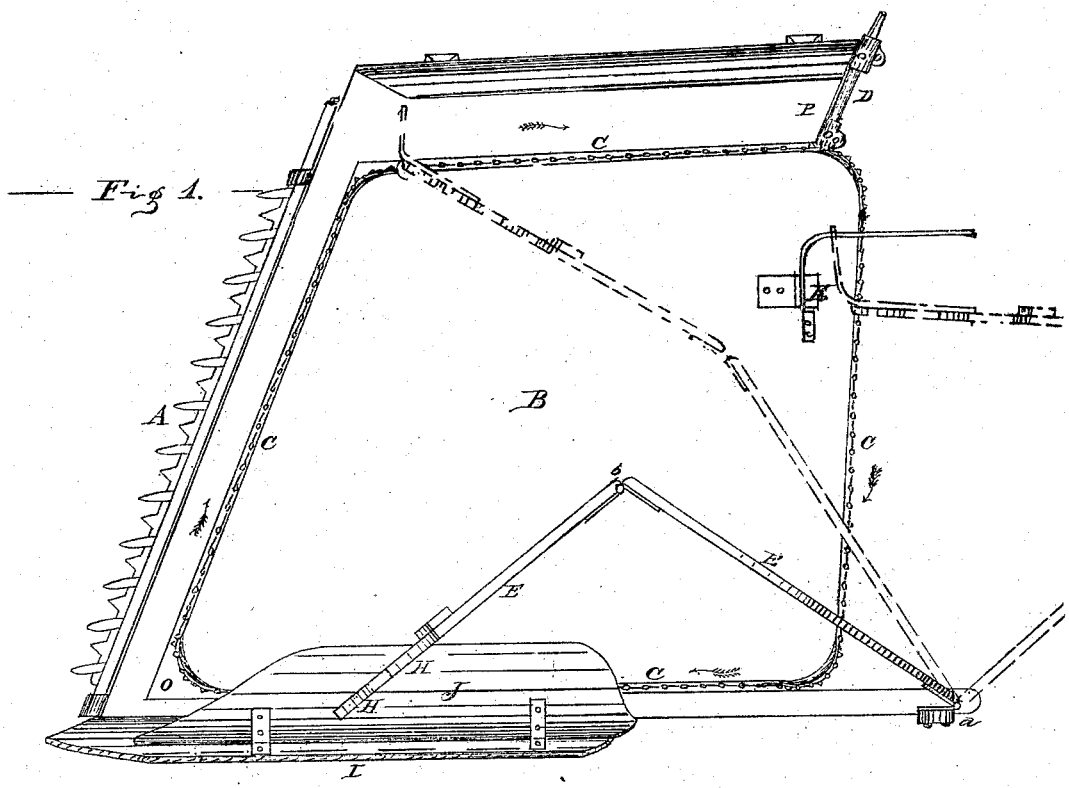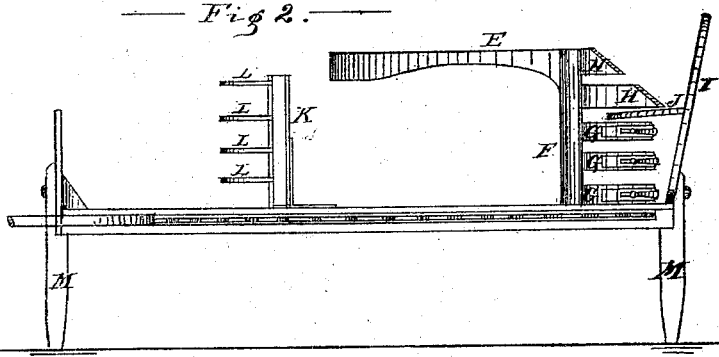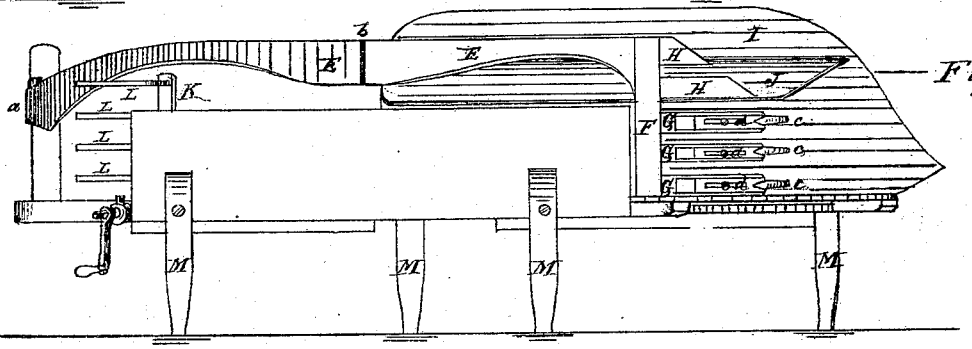

ARA D. SPRAGUE AND ASBURY DOCKUM, OF CALEDONIA, MINNESOTA.

IMPROVEMENT IN HARVESTER-RAKES.

Specification forming part of Letters Patent No. 54,789, dated May 15, 1866.

*To all whom it may concern:*

Be it known that we, ARA D. SPRAGUE and ASBURY DOCKUM, of Caledonia, in the county of Houston and State of Minnesota, have invented a new and useful Improvement in Self-Raking Attachment for Harvesters; and we do hereby declare and make known that the following is a full, clear, and exact description of the same, reference being had to the accompanying drawings and the letters and figures marked thereon, which form part of this specification.

The nature of our said invention consists in a novel arrangement for preventing the grain from falling over the rake at that point where it first enters the same; also, in a novel arrangement for preventing the grain from scattering at the point where the rake leaves the gavel or bundle; and also in a novel mode of lengthening the rake-head or adjusting its length to adapt it to light or heavy standing grain.

To enable those skilled in the art to understand how to construct and use our invention, we will proceed to describe the same with particularity, making reference in so doing to the aforesaid drawings, in which—

Figure 1 represents a plan or top view of our invention; Fig. 2, a front elevation of the same, and Fig. 3 is a side elevation thereof.

The same letters of reference in the different figures denote like parts of our invention.

A represents the position of the sickle at the front of the machine, and B is the raking platform arranged immediately behind the sickle, as shown.

C represents an endless chain passing around the platform, being supported upon toothed wheels at each corner and by suitable intermediate rests, so that by revolving the shaft D by means of suitable gearing the said endless chain is caused to move around in the direction of the arrows shown on Fig. 1.

E represents a jointed arm attached to the rake F G, said arm being hinged at $a$ and having an elbow at $b$, as shown, so as to permit the rake to travel around in its path, as hereinafter set forth, different positions of said rake and arm being indicated by the red line in Fig. 1.

The rake is moved around by the endless chain C, there being a vertical pin projecting up from said chain which enters into a corresponding socket in the lower part of the rake-head for that purpose.

The general features hereinbefore described and mentioned are in common use, and are not claimed as our invention or any part of it; but in the machines now in use there is a great tendency of the falling grain to rest upon the top of the rake, where it approaches the corner, (marked $o$,) and fall over behind the rake, instead of being moved along by the rake, as it should be.

To obviate this difficulty we attach to the dividing-board I a shelf, J, arranged as shown just above the top of the rake as ordinarily constructed. We then increase the height of the rake-head and attach thereto the inclined arm, (marked H,) which passes just above said shelf J, as shown. By this arrangement, as the grain falls down at the corner $o$ it is prevented from falling upon the platform, resting as it does upon the inclined edges of the said shelf J, which inclination of said shelf allows the grain to move backward and inward, so as to be caught at its lower ends by the rake; but the rake would move forward under the grain and leave it behind were it not for the arm H above the shelf J, which at the same time carries forward the upper ends of the grain, and thus the desired object is accomplished.

The arms H form, as it were, a part of the rake, being sloped or inclined, as shown, to make room for the reel to revolve in the proper position.

To prevent the scattering of the grain at the point where the rake leaves the gavel at P, there is erected at a suitable point an upright or post, K, to which are attached a series of stationary fingers, (marked L,) as shown. In order to operate in connection with this device the rake-head is slotted, being divided into as many horizontal arms G below the shelf J as there are teeth, the arm H being slotted in like manner for the same purpose, as shown. By this arrangement the rake passes freely through between the said stationary fingers L as it leaves the gavel, but the grain is held by the said fingers, and thus the rake-teeth are withdrawn from the grain without scattering it or displacing or disarranging the gavel.

The rake-teeth (marked $c$) are each provided with a longitudinal slot, (marked $d$,) and are secured to the arms G by set-screws or other suitable devices passing through said slots $d$. That part of the teeth which contains the slots lies parallel with the arms G, so that moving said teeth out or drawing them in has simply the effect to lengthen or shorten the arms G or the rake-head without altering the length of the teeth proper, which is very desirable.

The parts marked M are simply supports to uphold the machine, which, in a practical machine, would be accomplished in other ways.

Having described the construction and operation of our invention, we will now specify what we claim and desire to secure by Letters Patent:

1. The combination and arrangement of the elevated rake-head G F and arm H with the shelf J, constructed and operating substantially as and for the purposes herein delineated and shown.

2. In combination with a slotted rake-head, F G, the employment of the stationary fingers L, arranged and operating as and for the purposes set forth and shown.

3. The adjustable teeth $c$, when constructed, arranged, and operating as and for the purposes shown and described.

ARA D. SPRAGUE.
ASBURY DOCKUM.

Witnesses:
P. H. THOMAS,
D. U. GATES.